United States Patent
Bellar et al.

(10) Patent No.: US 10,800,609 B2
(45) Date of Patent: Oct. 13, 2020

(54) FOLDING WING FOR A CONVEYOR

(71) Applicant: Walmart Apollo, LLC, Bentonville, AR (US)

(72) Inventors: Jason Bellar, Bella Vista, AR (US); William Mark Propes, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/593,466

(22) Filed: Oct. 4, 2019

(65) Prior Publication Data

US 2020/0122928 A1 Apr. 23, 2020

Related U.S. Application Data

(60) Provisional application No. 62/749,089, filed on Oct. 22, 2018.

(51) Int. Cl.
*B65G 13/12* (2006.01)
*B65G 39/12* (2006.01)
(Continued)

(52) U.S. Cl.
CPC ............. *B65G 13/12* (2013.01); *B65G 21/14* (2013.01); *B65G 39/02* (2013.01); *B65G 39/12* (2013.01)

(58) Field of Classification Search
CPC ........ B65G 13/12; B65G 13/02; B65G 13/08; B65G 15/26; B65G 17/28; B65G 21/10;
(Continued)

(56) References Cited

U.S. PATENT DOCUMENTS 2,590,359 A 3/1952 Zopf
3,599,784 A * 8/1971 Rossi ................... B65G 21/14
198/313

(Continued)

FOREIGN PATENT DOCUMENTS

EP 0343837 A1 11/1989
JP 2008037582 A 2/2008

OTHER PUBLICATIONS

Copenheaver, Blaine R., "International Search Report", International Application No. PCT/US2019/054720, dated Dec. 11, 2019, 2 pages.

(Continued)

*Primary Examiner* — James R Bidwell

(57) ABSTRACT

A folding wing for a conveyor is disclosed that can extend to facilitate sorting of items and providing additional space for docking locations. A first and second section each have a conveyor surface; and are coupled with a reverse-knee joint such that, in a folded configuration the conveyor surface of the first section and the conveyor surface of the second section are adjacent, and in an unfolded configuration, the first section conveyor surface and the second section conveyor surface form a contiguous conveyor surface. In some examples, the frame may be made of aluminum, and the rollers made of PVC, in order to reduce weight. In some examples, the folding section may measure approximately two feet by two feet. The folding assembly may drop down for even more space savings, when not in use, and be supported in an extended configuration with a second reverse knee joint.

18 Claims, 12 Drawing Sheets

(51) Int. Cl.
*B65G 21/14* (2006.01)
*B65G 39/02* (2006.01)

(58) Field of Classification Search
CPC .............. B65G 37/005; B65G 2207/14; B65G 2207/30; B65G 21/14; B65G 39/12; B65G 39/02; B07C 5/36
USPC .......................................... 198/313, 581, 632
See application file for complete search history.

(56) References Cited

U.S. PATENT DOCUMENTS

| | | | |
|---|---|---|---|
| 4,266,650 A * | 5/1981 | Patel ...................... | B65G 13/12 16/368 |
| 4,811,830 A | 3/1989 | Felder | |
| 5,044,484 A * | 9/1991 | Douglas ................. | B65G 21/14 198/313 |
| 5,086,911 A | 2/1992 | Douglas | |
| 5,172,804 A | 12/1992 | Chersin | |
| 5,360,097 A | 11/1994 | Hibbs | |
| 5,443,351 A * | 8/1995 | Pettijohn ................... | B60P 1/36 198/632 |
| 6,719,119 B1 | 4/2004 | Hendzel et al. | |
| 7,347,311 B2 * | 3/2008 | Rudge ................... | B65G 21/14 198/313 |
| 7,494,409 B2 | 2/2009 | Voss et al. | |
| 8,881,887 B2 * | 11/2014 | Jorgensen .............. | B65G 21/10 198/313 |
| 9,604,258 B2 | 3/2017 | Layne et al. | |
| 2003/0121761 A1 | 7/2003 | Wagstaffe | |
| 2009/0065327 A1 | 3/2009 | Evangelista et al. | |
| 2015/0144536 A1 | 5/2015 | Dugat | |
| 2020/0189853 A1 * | 6/2020 | Karol ................... | B65G 41/002 |

OTHER PUBLICATIONS

Copenheaver, Blaine R. "Written Opinion", International Application No. PCT/US2019/054720, dated Dec. 11, 2019, 8 pages.

* cited by examiner

FOLDING WING FOR A CONVEYOR

BACKGROUND

In large retail settings, the delivery, unloading, and sorting of items can be a significant aspect of operational efficiency. Convoluted, wasteful, and labor-intensive operations can degrade efficiency and negatively impact profitability. In some conventional approaches, this delivery, unloading, and sorting process has been a largely manual process, involving employees unloading items from a delivery vehicle, placing the items on carts, and then pushing or pulling the carts around the retail floor space to the proper shelf location.

Some retail facilities may use a mechanized routing arrangement, involving a conveyor track, either powered or gravity-driven, to move items from a delivery vehicle to an in-store cart. However, space available for the routing arrangement may be limited, as many retail store designs seek to maximize the amount of retail floor space for a given facility size. Thus, the operational and physical flexibility, as well as the footprint, of a mechanized routing arrangement may affect usability and further impact a retail entity's operational efficiency.

SUMMARY

A folding wing for a conveyor is disclosed that can extend to facilitate sorting of items and providing additional space for docking locations. A first and second section each have a conveyor surface; and are coupled with a reverse-knee joint such that, in a folded configuration the conveyor surface of the first section and the conveyor surface of the second section are adjacent, and in an unfolded configuration, the first section conveyor surface and the second section conveyor surface form a contiguous conveyor surface. In some examples, the frame may be made of aluminum, and the rollers made of polyvinyl chloride (PVC), in order to reduce weight. In some examples, the folding section may measure approximately two feet by two feet. The folding assembly may drop down for even more space savings, when not in use, and be supported in an extended configuration with a second reverse knee joint.

BRIEF DESCRIPTION OF THE DRAWINGS

The disclosed examples are described in detail below with reference to the accompanying drawing figures listed below.

Figure 1:
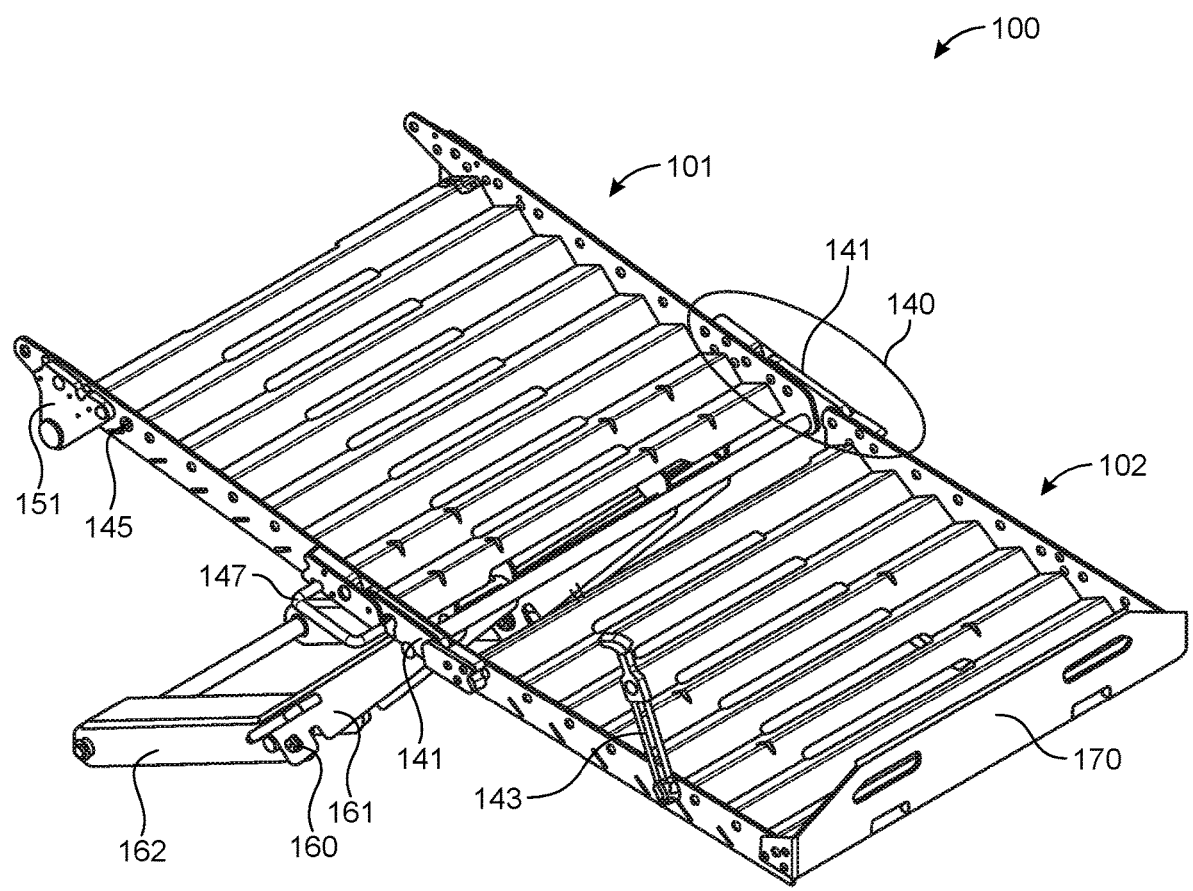
FIG. 1 illustrates an exemplary folding wing for a conveyor.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

A folding wing for a conveyor is disclosed that can extend to facilitate sorting of items and providing additional space for docking locations. A first and second section each have a conveyor surface, and are coupled with a reverse-knee joint such that, in a folded configuration the conveyor surface of the first section and the conveyor surface of the second section are adjacent, and in an unfolded configuration, the first section conveyor surface and the second section conveyor surface form a contiguous conveyor surface. In some examples, the frame may be made of aluminum, and the rollers made of polyvinyl chloride (PVC), in order to reduce weight. In some examples, the folding section may measure approximately two feet by two feet. The folding assembly may drop down for even more space savings, when not in use, and be supported in an extended configuration with a second reverse knee joint.

FIG. 1 illustrates an exemplary folding wing 100 for a conveyor. Folding wing 100 has a first section 101 and a second section 102. First section 101 and second section 102 are coupled with a first reverse-knee joint 140 (one side of reverse-knee joint 140 is circled, although in the illustrated example, reverse-knee joint 140 spans the width of first section 101 and second section 102). Reverse-knee joint 140 permits second section 102 to fold up against first section 101 to make folding wing 100 more compact when it is not in use. Reverse-knee joint 140 is held in a straight position (an unfolded configuration) with a tension element 141 (one shown on each side) that prevents reverse-knee joint 140 from hyper-extending and pointing second section 102 downward. A latch 147 works with tension element 141 to lock first section 101 and second section 102 in the unfolded configuration. Another latch 143 slides over a peg 145 to lock second section 102 up against first section 101, when second section 102 and first section 101 are in a folded configuration. A conveyor gate 170, disposed on an end of second section 102, prevents items from rolling off second section 102 and falling.

A second reverse-knee joint 160 retains first section 101 in an extended configuration, or permits first section 101 to be lowered into a dropped configuration in which first section 101 is oriented vertically downward from an upper connection point attached to a hinge portion 151. To accomplish this a leg portion 161 couples first section 101 to reverse-knee joint 160, and a leg portion 162 couples reverse-knee joint 160 to a stable, weight bearing point. Further explanation of the actions of reverse knee joints 140 and 160 are provided with FIGS. 3A-4.

Figure 2:
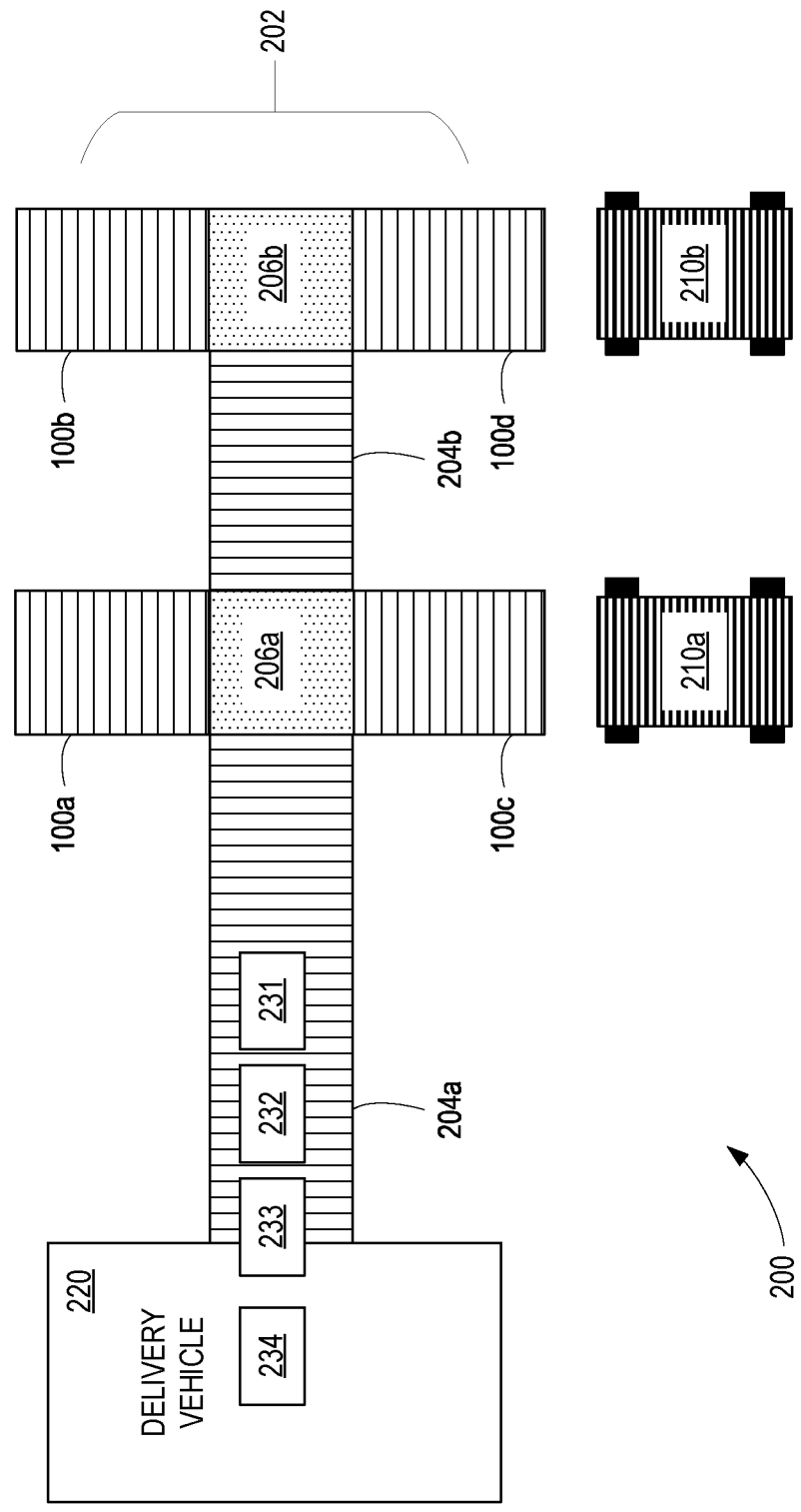
FIG. 2 illustrates an exemplary conveyor arrangement that can advantageously employ the folding wing of FIG. 1.

FIG. 2 illustrates an exemplary conveyor arrangement 200 that can advantageously employ one or more examples of folding wing 100. A conveyor assembly 202 includes a first conveyor track 204a, a first sorting tee 206a, second conveyor track 204b, and a second sorting tee 206b. Conveyor assembly 202 also includes four examples of folding wing 100, designated as folding wing 100a, folding wing 100b, folding wing 100c, and folding wing 100d. Folding wing 100a and folding wing 100c are each disposed adjacent to sorting tee 206a of conveyor assembly 202; folding wing 100b and folding wing 100b are each disposed adjacent to sorting tee 206b of conveyor assembly 202.

As illustrated, a first cart 210a is approaching folding wing 100c, and a second cart 210b is approaching folding wing 100d, in order to receive a load of items for delivery. One or both of cart 210a and cart 210b may be an autonomous ground vehicle (AGV). Also as illustrated, a delivery vehicle 220 is unloading items 231, 232, 233, and 234 onto conveyor assembly 202. One or more of items 231, 232, 233, and 234 may pass over folding wing 100c or folding wing 100d to be loaded onto one of carts 210a and 210b.

Figure 3A:
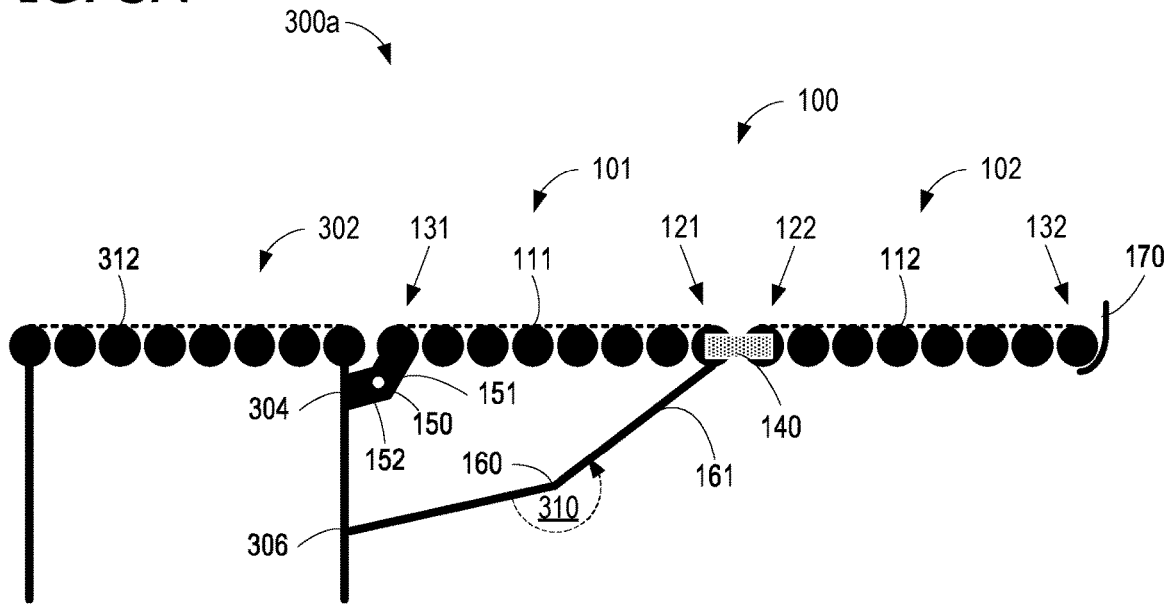
FIG. 3A shows the folding wing of FIG. 1 in an extended and unfolded configuration.
Figure 3B:
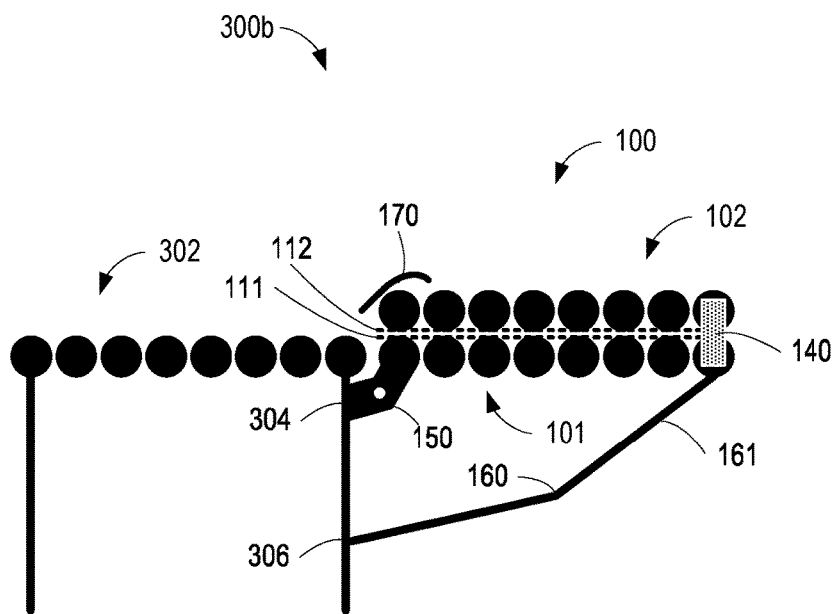
FIG. 3B shows the folding wing of FIG. 1 in an extended and folded configuration.
Figure 3C:
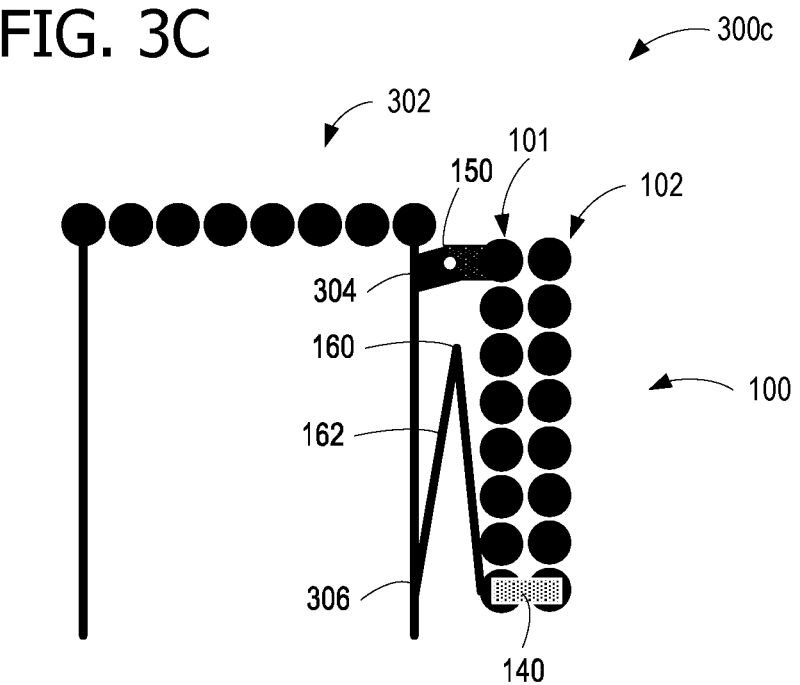
FIG. 3C shows the folding wing of FIG. 1 in a dropped and folded configuration.

FIG. 3A shows folding wing 100 in an extended and unfolded configuration 300a. FIG. 3B shows folding wing 100 in an extended and folded configuration 300b. FIG. 3C shows folding wing 100 in a dropped and folded configuration 300c. FIGS. 3A-3C should be viewed together.

First section 101 comprises a first conveyor surface 111 atop a plurality of rollers. (See also FIG. 5). First section 101 has a first end 121 and a second end 131. Second section 102 comprises a second conveyor surface 112 atop a plurality of rollers. (See also FIG. 5). Second section 102 has a first end 122 and a second end 132. First reverse-knee joint 140 flexibly couples first end 121 of first section 101 with first end 122 of second section 102 such that, in a folded configuration first conveyor surface 111 and second conveyor surface 112 are adjacent, and in an unfolded configuration, first conveyor surface 111 and second conveyor surface 112 form a contiguous conveyor surface (the combination of first conveyor surface 111 and second conveyor surface 112, when they are parallel and end to end, as in FIG. 3A). Reverse-knee joint 140 is configured to retain first section 101 and second section 102 in the unfolded configuration. In some examples, this is accomplished using tension element 141 (of FIG. 1).

A hinge 150 is disposed on second end 131 of first section 101 opposite first end 121 of first section 101 for coupling first section 101 to a conveyor assembly 302 at an upper connection point 304. Conveyor assembly 302 is a portion of conveyor assembly 202 (of FIG. 2). If for example, conveyor assembly 302 is sorting tee 206a, then upper connection point 304 is disposed adjacent to a sorting tee of the conveyor assembly 302. Hinge portion 151 couples hinge 150 to first section 101, and hinge portion 152 couples hinge 150 to conveyor assembly 302 at upper connection point 304. Conveyor assembly 302 also comprises a conveyor surface 312 atop a plurality of rollers.

Second reverse-knee joint 160 flexibly couples first section 101 with conveyor assembly 302 at a lower connection point 306 such that, in a dropped configuration, first section 101 is oriented vertically downward from upper connection point 304, and in an extended configuration, first section 101 is disposed so that first conveyor surface 111 and conveyor surface 312 the conveyor assembly 302 form a contiguous conveyor surface (the combination of first conveyor surface 111 and conveyor surface 312, when they are parallel and end to end, as in FIG. 3A). Second reverse-knee joint 160 is configured to retain first section 101 in the extended configuration. Second reverse-knee joint 160 is held to a maximum opening angle by compression in the extended configuration, as explained with respect to FIG. 4. Second reverse-knee joint 160 opens to a maximum angle 310 greater than 180 degrees.

A conveyor gate 170 is disposed on second end 132 of second section 102 opposite first end 122 of second section 102. Conveyor gate 170 is illustrated in the up position, in FIG. 3A, which can prevent items from rolling off of folding wing 100. However, in some examples, conveyor gate 170 is moved to the down position to avoid interference problems in the folded configuration, as illustrated in FIG. 3B.

Figure 4:
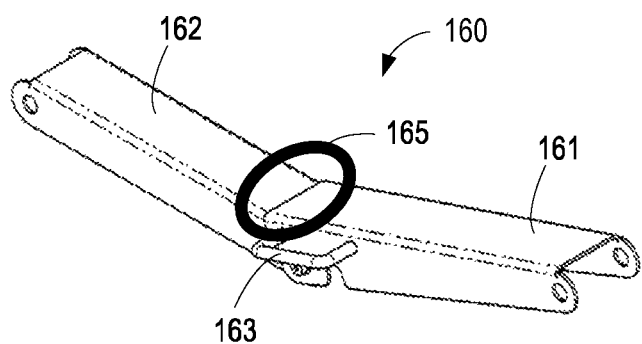
FIG. 4 illustrates an reverse knee joint that may be used with some examples of the folding wing of FIG. 1.

FIG. 4 illustrates a close-up view of reverse knee joint 160. As illustrated, reverse knee joint 160 is fully open to a maximum angle greater than 180 degrees. Reverse knee joint 160 is prevented from opening wider than its maximum angle because each of a leg portion 161 and leg portion 162 is an inverted c-shaped channel. At the maximum angle, leg portion 161 presses up against leg portion 162 at indicated region 165. A latch 163 retains reverse knee joint 160 at the maximum angle position, which thereby retains first section 101 in the extended configuration.

Figure 5:
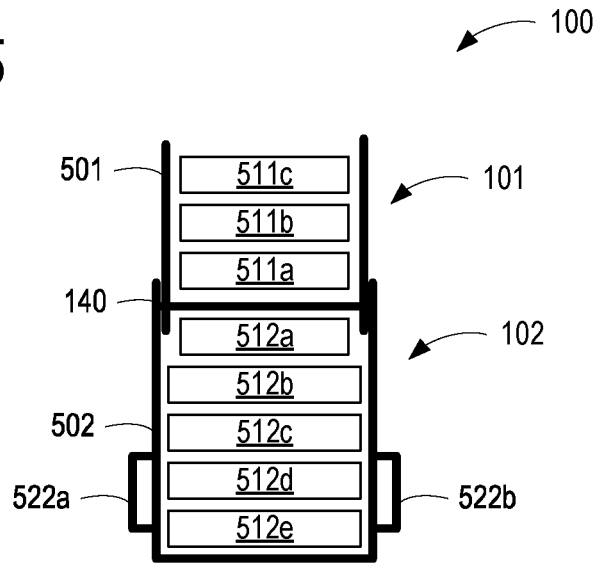
FIG. 5 illustrates a top view of the folding wing of FIG. 1.

FIG. 5 illustrates a top view of folding wing 100. First section 101 comprises a frame 501 and a plurality of parallel rollers 511a-511c. The tops of rollers 511a-511c form conveyor surface 111 (of FIG. 3A). First section 101 is coupled to second section 102 with reverse-knee joint 140. Second section 102 comprises a frame 502 and a plurality of parallel rollers 512a-512e. The tops of rollers 512a-512e form conveyor surface 112 (of FIG. 3A). In some examples, frame 501 and frame 502 may be constructed of aluminum, in order to save weight. In some examples, rollers 511a-511c and rollers 512a-512e are constructed, at least partially, of PVC, also in order to save weight. In some examples, each of first section 101 and second section 102 measure approximately two feet in width by two feet in length. That is, in some examples, conveyor surface 112, of second section 102, measures between 1 foot and 3 feet in width and between 1 foot and 3 feet in length. With lightweight construction and these dimensions some examples of second section 102 are under 50 pounds, and even some examples of folding wing 100 are under 50 pounds.

In order to provide additional usability, a lifting handle 522a is attached to frame 502 of second section 102, and another lifting handle 522b is also attached to frame 502 of second section 102. Lifting handles 522a and 522b may be grasped in order to move second section 102 when folding second section 102 over top of first section 101.

Figure 6:
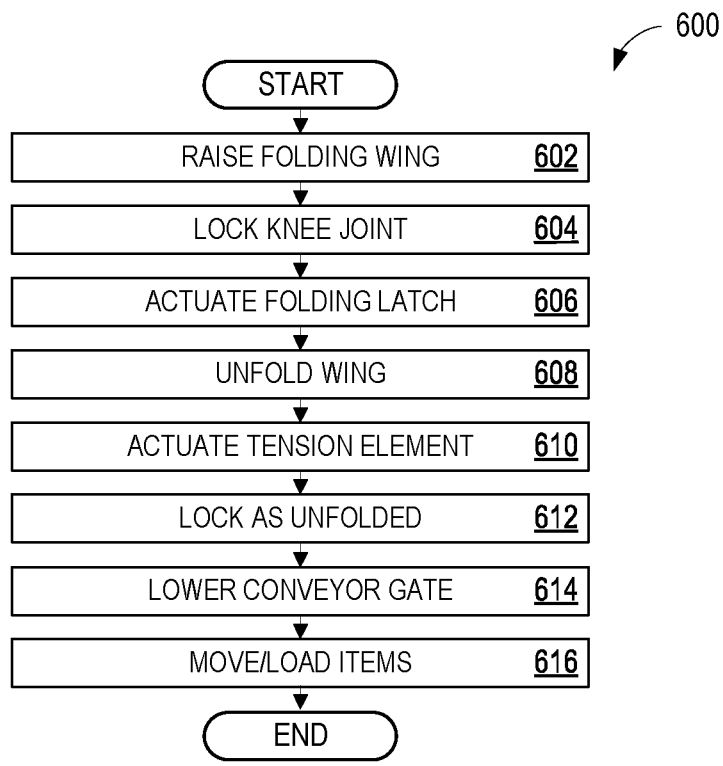
FIG. 6 is a flow diagram of operations associated with using the folding wing of FIG. 1.

FIG. 6 is a flow diagram 600 of operations associated with using folding wing 100. Flow diagram begins at 602 with raising a first folding wing section from a dropped configuration to an extended configuration, whereby the first section is retained in the extended configuration by a second reverse-knee joint (e.g., reverse knee joint 160). In some examples, the second reverse knee joint is held in place with compression, at an opening angle exceeding 180 degrees, and locked in place using a latch at 604. A latch that retains the first folding wing section and a second folding wing section in a folded configuration is released by actuation, at 606. That is, operation 606 includes actuating a latch that retains the first folding wing section and the second folding wing section in the folded configuration, to permit the unfolding. In some examples, this includes pulling a flexible member off from a peg.

Operation 608 includes unfolding the second folding wing section from the folded configuration with the first folding wing section to an unfolded configuration such that a conveyor surface of the first folding wing section and a second conveyor surface of the second folding wing section form a contiguous conveyor surface. Operation 610 includes actuating a tension element so that the first folding wing section and the second unfolding wing section are retained in the unfolded configuration by a first reverse-knee joint.

The second folding wing section and the first folding wing section are locked in the unfolded configuration using a latch at 612. Operation 614 includes lowering a conveyor gate disposed on an end of the second folding wing section. The folding wing is then used to move items and load carts at 616.

Figure 7A:
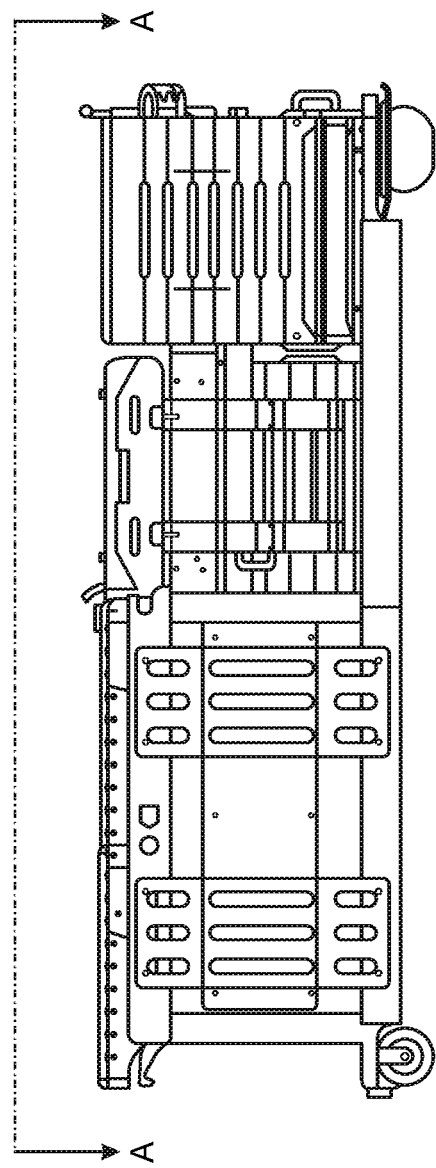
FIGS. 7A-7C illustrates an exemplary conveyor arrangement that can advantageously employ the folding wing of FIG. 1.
Figure 7B:
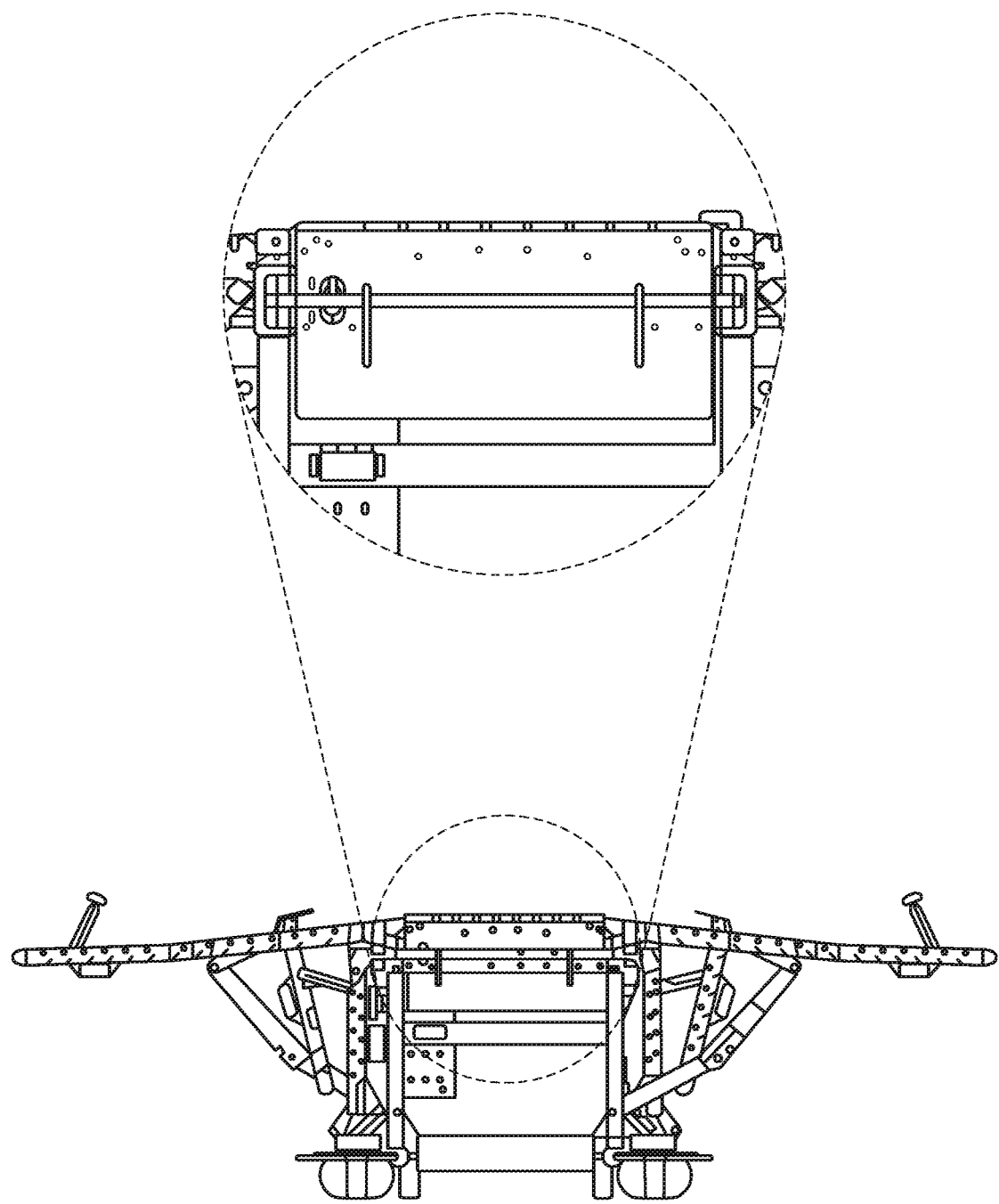
Figure 7C:
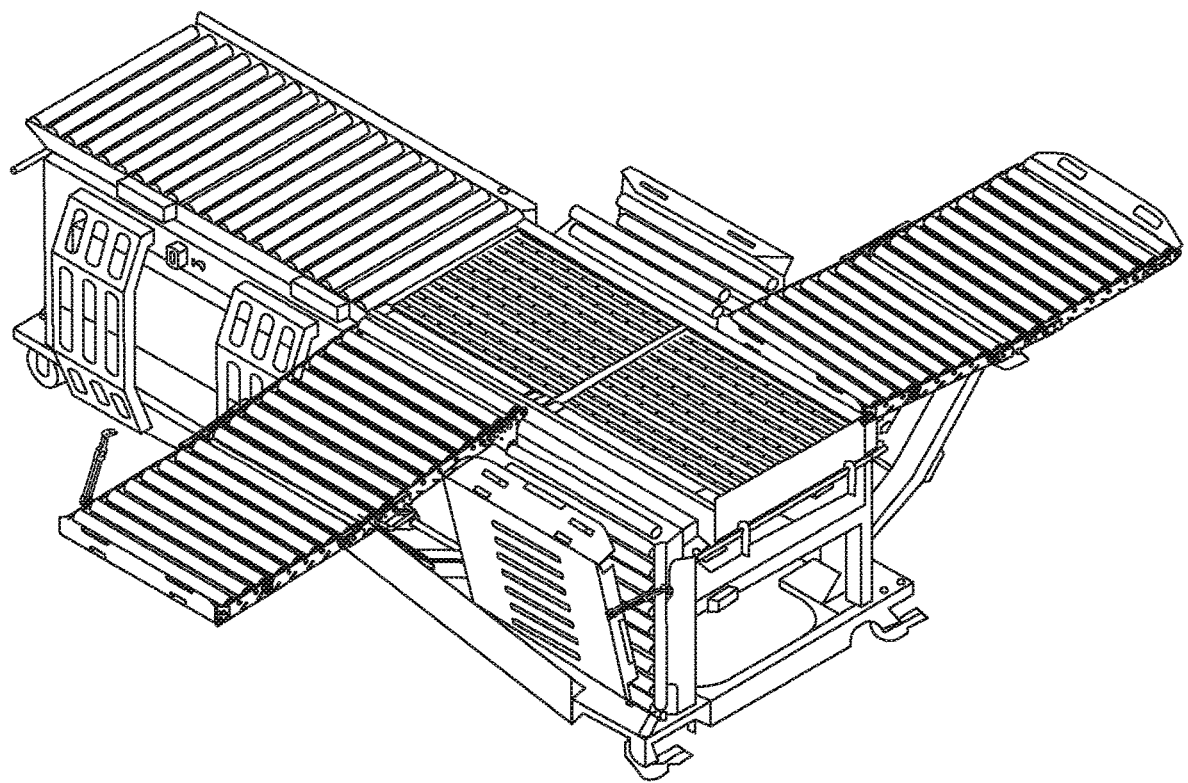

FIGS. 7A-7C illustrates an exemplary conveyor arrangement that can advantageously employ the folding wing of FIG. 1.

Figure 8:
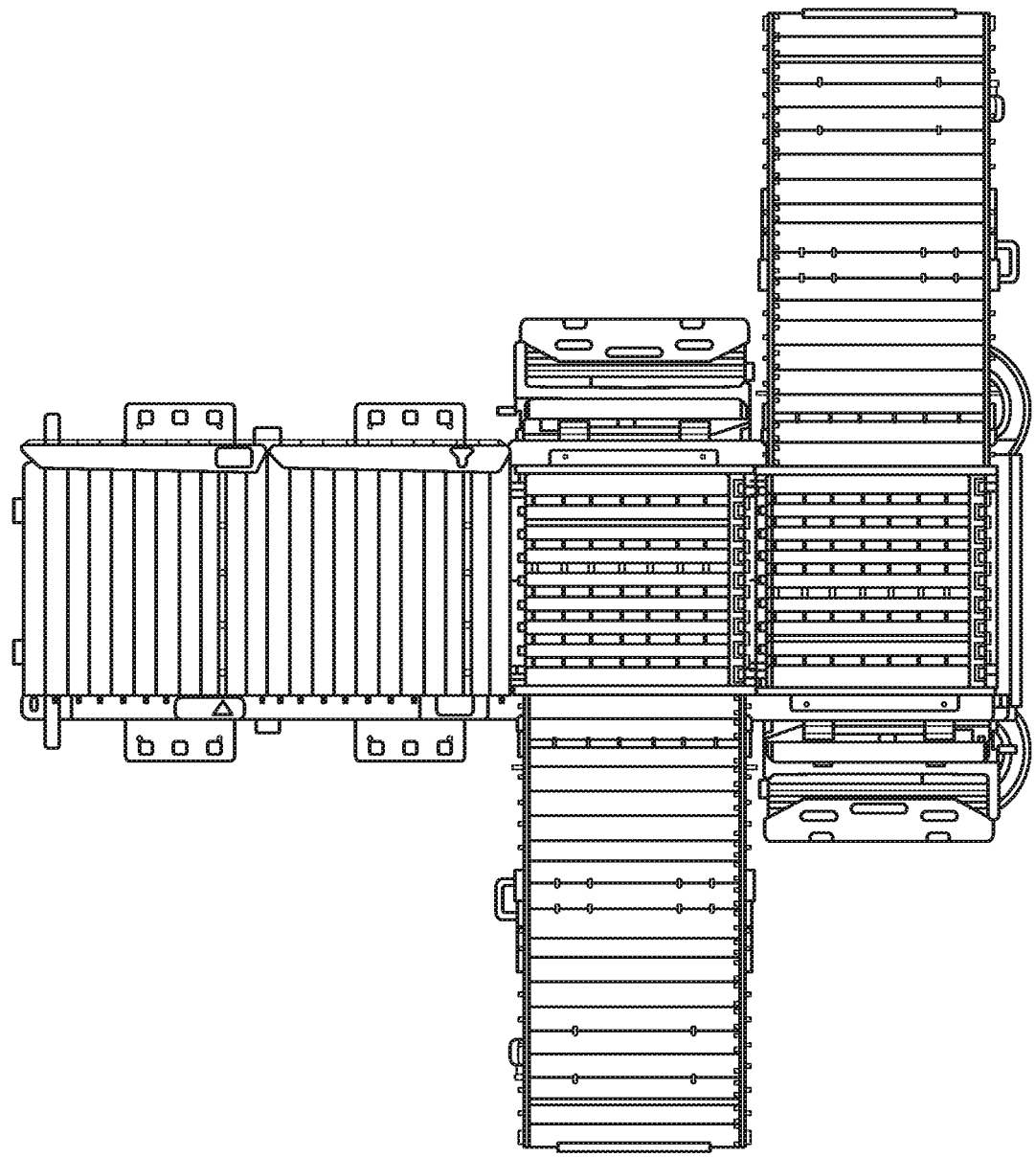
FIG. 8 illustrates an exemplary conveyor arrangement that can advantageously employ the folding wing of FIG. 1.

FIG. 8 illustrates an exemplary conveyor arrangement that can advantageously employ the folding wing of FIG. 1.

Figure 9:
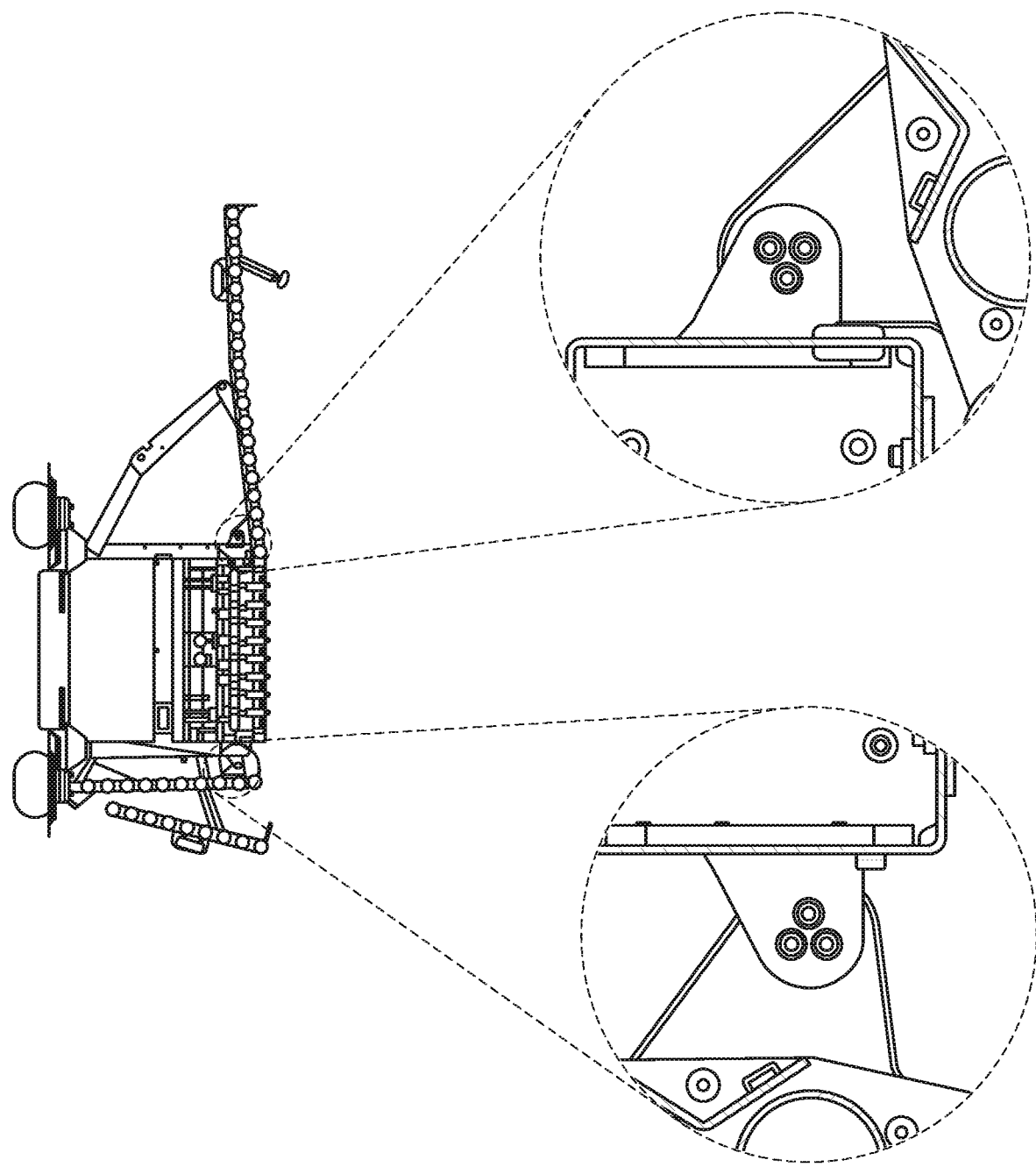
FIG. 9 shows the folding wing of FIG. 1 in an extended and unfolded configuration.

FIG. 9 shows the folding wing of FIG. 1 in an extended and unfolded configuration.

Figure 10:
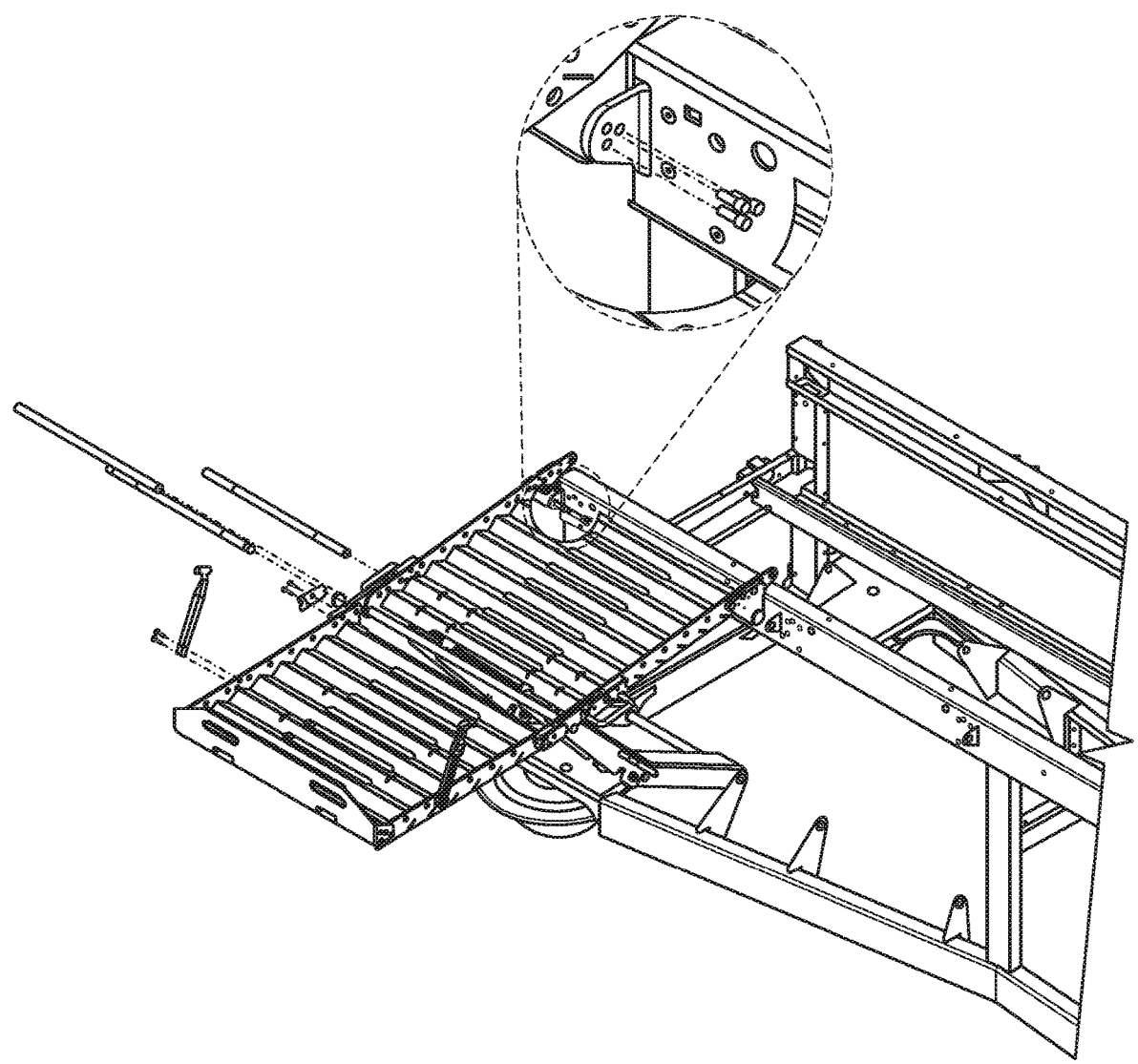
FIG. 10 illustrates a left-hand side configuration of the folding wing of FIG. 1.

FIG. 10 illustrates a left-hand side configuration of the folding wing of FIG. 1.

Figure 11:
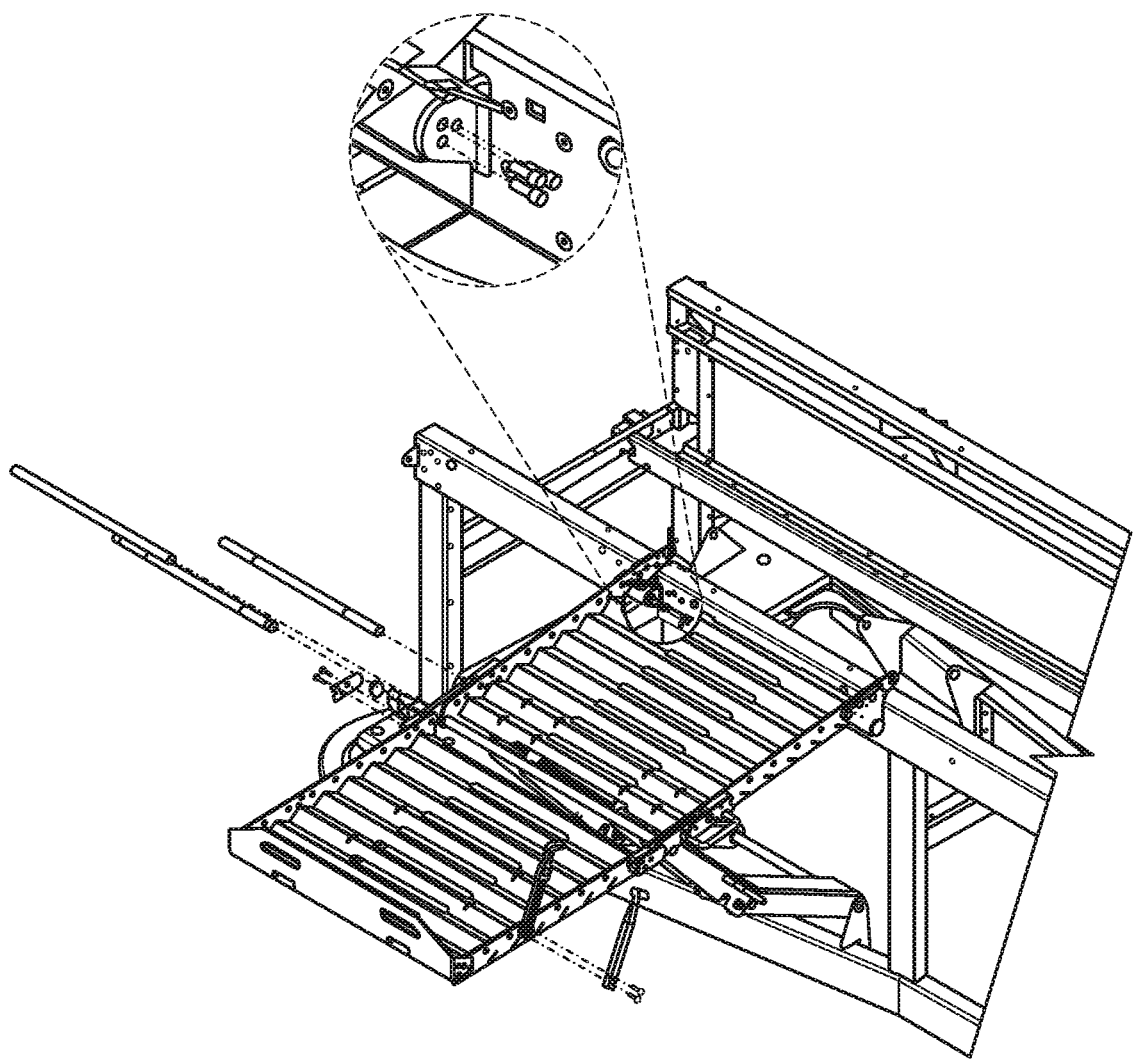
FIG. 11 illustrates a right-hand side configuration of the folding wing of FIG.

FIG. 11 illustrates a right-hand side configuration of the folding wing of FIG.

Exemplary Operating Methods and Systems

An exemplary folding wing for a conveyor comprises: a first section comprising a first conveyor surface; a second section comprising a second conveyor surface; and a first reverse-knee joint flexibly coupling a first end of the first section with a first end of the second section such that, in a folded configuration the first conveyor surface and the second conveyor surface are adjacent, and in an unfolded configuration, the first conveyor surface and the second conveyor surface form a contiguous conveyor surface, and wherein the first reverse-knee joint is configured to retain the first section and the second section in the unfolded configuration.

Another exemplary folding wing for a conveyor comprises: a first section comprising a first conveyor surface; a second section comprising a second conveyor surface, wherein a frame of the second section comprises aluminum, wherein the second conveyor surface comprises a plurality of parallel rollers, wherein the rollers comprise PVC, and wherein the second conveyor surface measures between 1 foot and 3 feet in width and between 1 foot and 3 feet in length; a first reverse-knee joint flexibly coupling a first end of the first section with a first end of the second section such that, in a folded configuration the first conveyor surface and the second conveyor surface are adjacent, and in an unfolded configuration, the first conveyor surface and the second conveyor surface form a contiguous conveyor surface, wherein the first reverse-knee joint is configured to retain the first section and the second section in the unfolded configuration, and wherein the first reverse-knee joint is held to a maximum opening angle by a tension element in the unfolded configuration; a first latch to retain the first section and the second section in the folded configuration; a second latch to retain the first section and the second section in the unfolded configuration a hinge disposed on a second end of the first section opposite the first end of the first section for coupling the first section to a conveyor assembly at an upper connection point; a second reverse-knee joint flexibly coupling the first section with the conveyor assembly at a lower connection point such that, in a dropped configuration the first section is oriented vertically downward from the upper connection point, and in an extended configuration, the first section is disposed so that the first conveyor surface and a conveyor surface of the conveyor assembly form a contiguous conveyor surface, wherein the second reverse-knee joint is configured to retain the first section in the extended configuration, wherein the second reverse-knee joint is held to a maximum opening angle by compression in the extended configuration, and wherein the second reverse-knee joint opens to a maximum greater than 180 degrees; a third latch to retain the first section in the extended configuration; a conveyor gate disposed on a second end of the second section opposite the first end of the second section; and a lifting handle attached to a frame of the second section.

An exemplary method of operating a folding wing for a conveyor comprises: raising a first folding wing section from a dropped configuration to an extended configuration, whereby the first section is retained in the extended configuration by a second reverse-knee joint; and unfolding a second folding wing section from a folded configuration with the first folding wing section to an unfolded configuration such that a conveyor surface of the first folding wing section and a second conveyor surface of the second folding wing section form a contiguous conveyor surface, and wherein the first folding wing section and the second unfolding wing section are retained in the unfolded configuration by a first reverse-knee joint.

Alternatively, or in addition to the other examples described herein, examples include any combination of the following:
- a frame of the second section comprises aluminum;
- the second conveyor surface comprises a plurality of parallel rollers;
- the rollers comprise PVC;
- the second conveyor surface measures between 1 foot and 3 feet in width and between 1 foot and 3 feet in length;
- the first reverse-knee joint is held to a maximum opening angle by a tension element in the unfolded configuration;
- a first latch to retain the first section and the second section in the folded configuration;
- a second latch to retain the first section and the second section in the unfolded configuration;
- a hinge disposed on a second end of the first section opposite the first end of the first section for coupling the first section to a conveyor assembly at an upper connection point;
- a second reverse-knee joint flexibly coupling the first section with the conveyor assembly at a lower connection point such that, in a dropped configuration the first section is oriented vertically downward from the upper connection point, and in an extended configuration, the first section is disposed so that the first conveyor surface and a conveyor surface of the conveyor assembly form a contiguous conveyor surface, and wherein the second reverse-knee joint is configured to retain the first section in the extended configuration;
the second reverse-knee joint is held to a maximum opening angle by compression in the extended configuration;
the second reverse-knee joint opens to a maximum angle greater than 180 degrees;
a third latch to retain the first section in the extended configuration;
the upper connection point is disposed adjacent to a sorting tee of the conveyor assembly;
a conveyor gate disposed on a second end of the second section opposite the first end of the second section;
a lifting handle attached to a frame of the second section;
actuating a latch that retains the first folding wing section and the second folding wing section in the folded configuration, to permit the unfolding; and
lowering a conveyor gate disposed on an end of the second folding wing section.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A folding wing for a conveyor, the folding wing comprising:
   a first section comprising a first conveyor surface;
   a second section comprising a second conveyor surface;
   a first reverse-knee joint flexibly coupling a first end of the first section with a first end of the second section such that, in a folded configuration the first conveyor surface and the second conveyor surface are adjacent, and in an unfolded configuration, the first conveyor surface and the second conveyor surface form a contiguous conveyor surface, and wherein the first reverse-knee joint is configured to retain the first section and the second section in the unfolded configuration;
   a hinge disposed on a second end of the first section opposite the first end of the first section for coupling the first section to a conveyor assembly at an upper connection point; and
   a second reverse-knee joint flexibly coupling the first section with the conveyor assembly at a lower connection point such that, in a dropped configuration the first section is oriented vertically downward from the upper connection point, and in an extended configuration, the first section is disposed so that the first conveyor surface and a conveyor surface of the conveyor assembly form a contiguous conveyor surface, and wherein the second reverse-knee joint is configured to retain the first section in the extended configuration.

2. The folding wing of claim 1 wherein a frame of the second section comprises aluminum.

3. The folding wing of claim 1 wherein the second conveyor surface comprises a plurality of parallel rollers.

4. The folding wing of claim 3 wherein the rollers comprise polyvinyl chloride (PVC).

5. The folding wing of claim 1 wherein the second conveyor surface measures between 1 foot and 3 feet in width and between 1 foot and 3 feet in length.

6. The folding wing of claim 1 wherein the first reverse-knee joint is held to a maximum opening angle by a tension element in the unfolded configuration.

7. The folding wing of claim 1 further comprising:
   a first latch to retain the first section and the second section in the folded configuration.

8. The folding wing of claim 1 further comprising:
   a second latch to retain the first section and the second section in the unfolded configuration.

9. The folding wing of claim 1 wherein the second reverse-knee joint is held to a maximum opening angle by compression in the extended configuration.

10. The folding wing of claim 1 wherein the second reverse-knee joint opens to a maximum angle greater than 180 degrees.

11. The folding wing of claim 1 further comprising:
    a third latch to retain the first section in the extended configuration.

12. The folding wing of claim 1 wherein the upper connection point is disposed adjacent to a sorting tee of the conveyor assembly.

13. The folding wing of claim 1 further comprising:
    a conveyor gate disposed on a second end of the second section opposite the first end of the second section.

14. The folding wing of claim 1 further comprising:
    a lifting handle attached to a frame of the second section.

15. A method of operating a folding wing for a conveyor, the method comprising:
    raising a first folding wing section from a dropped configuration to an extended configuration, whereby the first section is retained in the extended configuration by a second reverse-knee joint; and
    unfolding a second folding wing section from a folded configuration with the first folding wing section to an unfolded configuration such that a conveyor surface of the first folding wing section and a second conveyor surface of the second folding wing section form a contiguous conveyor surface, and wherein the first folding wing section and the second unfolding wing section are retained in the unfolded configuration by a first reverse-knee joint.

16. The method of claim 15 further comprising:
actuating a latch that retains the first folding wing section and the second folding wing section in the folded configuration, to permit the unfolding.

17. The method of claim 15 further comprising:
lowering a conveyor gate disposed on an end of the second folding wing section.

18. A folding wing for a conveyor, the folding wing comprising:
a first section comprising a first conveyor surface;
a second section comprising a second conveyor surface,
   wherein a frame of the second section comprises aluminum,
   wherein the second conveyor surface comprises a plurality of parallel rollers,
   wherein the rollers comprise polyvinyl chloride (PVC), and
   wherein the second conveyor surface measures between 1 foot and 3 feet in width and between 1 foot and 3 feet in length;
a first reverse-knee joint flexibly coupling a first end of the first section with a first end of the second section such that, in a folded configuration the first conveyor surface and the second conveyor surface are adjacent, and in an unfolded configuration, the first conveyor surface and the second conveyor surface form a contiguous conveyor surface,
   wherein the first reverse-knee joint is configured to retain the first section and the second section in the unfolded configuration, and
   wherein the first reverse-knee joint is held to a maximum opening angle by a tension element in the unfolded configuration;
a first latch to retain the first section and the second section in the folded configuration;
a second latch to retain the first section and the second section in the unfolded configuration
a hinge disposed on a second end of the first section opposite the first end of the first section for coupling the first section to a conveyor assembly at an upper connection point;
a second reverse-knee joint flexibly coupling the first section with the conveyor assembly at a lower connection point such that, in a dropped configuration the first section is oriented vertically downward from the upper connection point, and in an extended configuration, the first section is disposed so that the first conveyor surface and a conveyor surface of the conveyor assembly form a contiguous conveyor surface,
   wherein the second reverse-knee joint is configured to retain the first section in the extended configuration,
   wherein the second reverse-knee joint is held to a maximum opening angle by compression in the extended configuration, and
   wherein the second reverse-knee joint opens to a maximum greater than 180 degrees;
a third latch to retain the first section in the extended configuration;
a conveyor gate disposed on a second end of the second section opposite the first end of the second section; and
a lifting handle attached to the frame of the second section.

\* \* \* \* \*